United States Patent
Kumon

(10) Patent No.: US 9,541,416 B2
(45) Date of Patent: Jan. 10, 2017

(54) MAP DISPLAY CONTROLLER

(71) Applicant: TOYOTA JIDOSHA KABUSHIKI KAISHA, Toyota-shi, Aichi-ken (JP)

(72) Inventor: Hitoshi Kumon, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/892,060

(22) PCT Filed: May 20, 2014

(86) PCT No.: PCT/IB2014/000774
§ 371 (c)(1),
(2) Date: Nov. 18, 2015

(87) PCT Pub. No.: WO2014/188253
PCT Pub. Date: Nov. 27, 2014

(65) Prior Publication Data
US 2016/0109256 A1 Apr. 21, 2016

(30) Foreign Application Priority Data

May 22, 2013 (JP) .................................. 2013-108253

(51) Int. Cl.
*G01C 21/36* (2006.01)

(52) U.S. Cl.
CPC ......... *G01C 21/3667* (2013.01); *G01C 21/367* (2013.01); *G01C 21/3664* (2013.01)

(58) Field of Classification Search
None
See application file for complete search history.

(56) References Cited

U.S. PATENT DOCUMENTS

| 2001/0028350 | A1 | 10/2001 | Matsuoka et al. |
| 2007/0226646 | A1* | 9/2007 | Nagiyama ............... G06F 3/016 715/784 |
| 2009/0307588 | A1* | 12/2009 | Tauchi ................ G06F 3/04812 715/702 |

FOREIGN PATENT DOCUMENTS

| JP | H11-153441 A | 6/1999 |
| JP | 2001-183151 A | 7/2001 |
| JP | 2002-365060 A | 12/2002 |
| JP | 2007-192881 A | 8/2007 |
| JP | 2008-045914 A | 2/2008 |
| JP | 2009-294827 A | 12/2009 |
| JP | 2010-107199 A | 5/2010 |

* cited by examiner

*Primary Examiner* — Thomas Tarcza
*Assistant Examiner* — Garrett Evans
(74) *Attorney, Agent, or Firm* — Oliff PLC

(57) ABSTRACT

A map display controller includes an operation portion that is operated in a predetermined operation range, an operation detecting unit that detects an operation on the operation portion, a reaction force generating unit that applies a reaction force against a change in position of the operation portion to the operation portion when an operation in which the position of the operation portion is changed to pass over a predetermined area in the operation range in a predetermined direction is performed, and a control unit that switches a display mode of a map display displayed on a display device when it is detected from the detection result of the operation detecting unit that the position of the operation portion passes over the predetermined area in the predetermined direction.

6 Claims, 9 Drawing Sheets

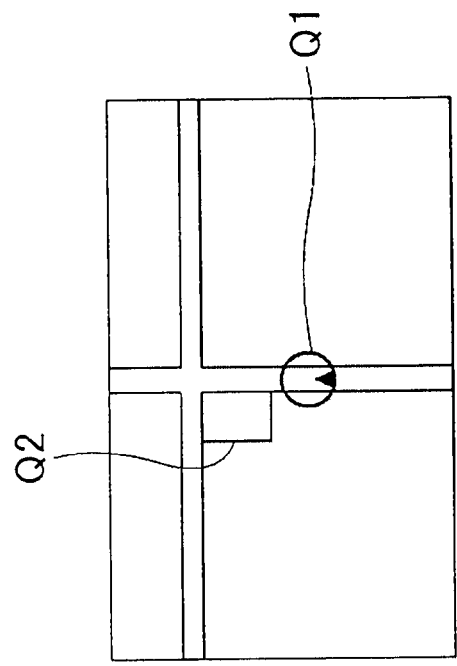
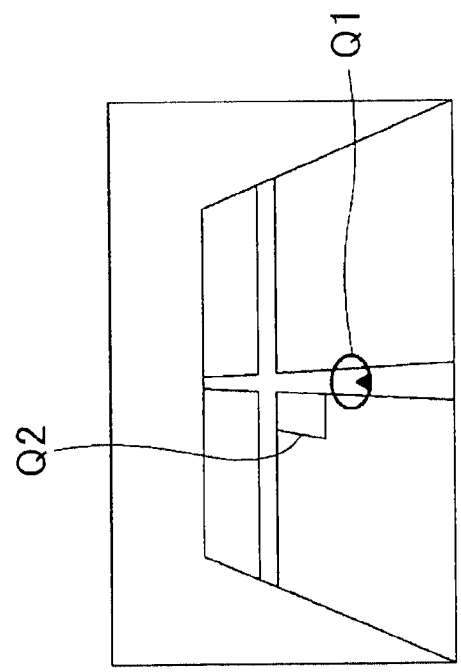

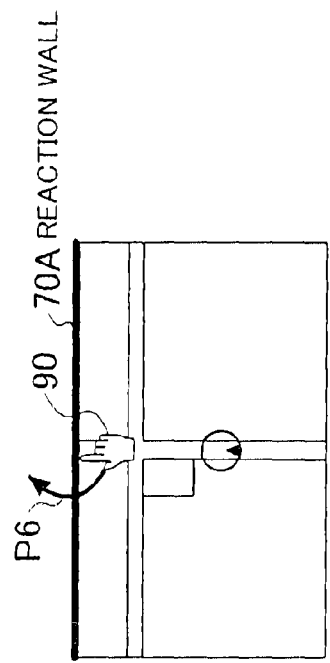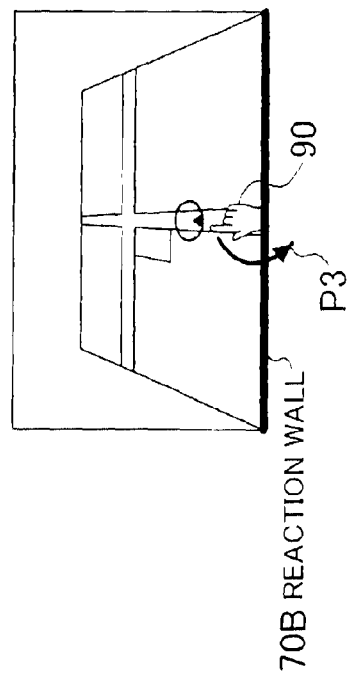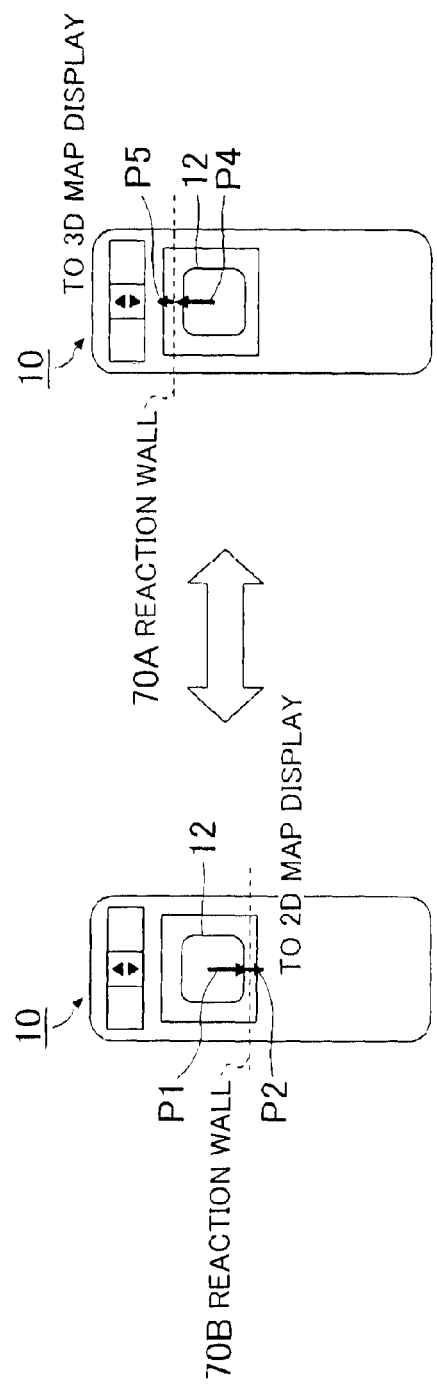
FIG. 5A
FIG. 5B

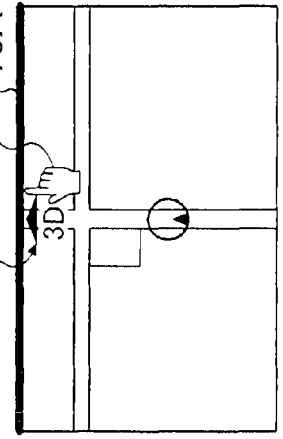
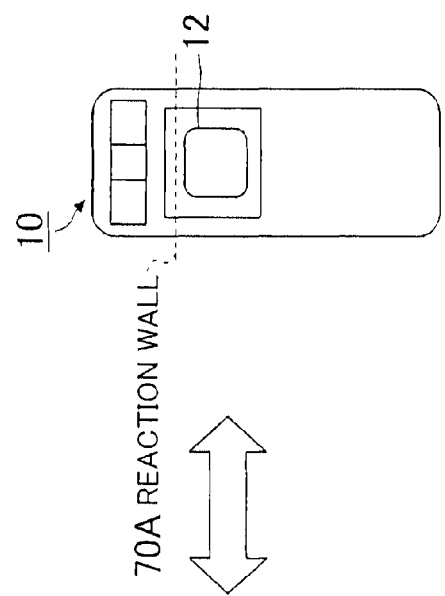
FIG. 7A
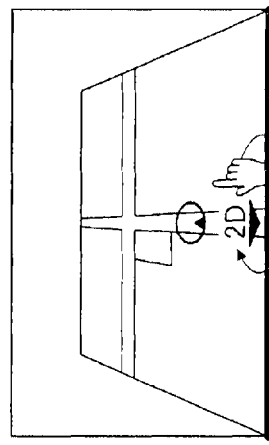
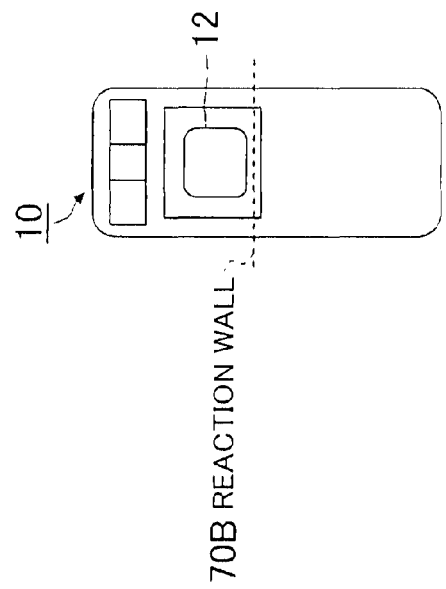
FIG. 7B

MAP DISPLAY CONTROLLER

BACKGROUND OF THE INVENTION

1. Field of the Invention

The present invention relates to a map display controller.

2. Description of Related Art

A navigation apparatus is known which performs a planar map display when an inclination of a display is in a first range and a bird's-eye map display when the inclination of the display is in a second range (for example, see Japanese Patent Application Publication No. 2008-045914 (JP 2008-045914 A)).

However, in the configuration disclosed in JP 2008-045914 A, since a display mode of a map display is switched depending on the inclination of the display, it may be difficult to switch the display mode of the map display in situations in which it is difficult to change the inclination of the display (for example, a situation in which the display is fixed).

SUMMARY OF THE INVENTION

The present invention provides a map display controller which can easily switch a display mode of a map display.

A map display controller according to a first aspect of the invention includes an operation portion that operates within a predetermined operation range, an operation detecting unit that detects an operation on the operation portion, a reaction force generating unit that applies a reaction force against a change in position of the operation portion to the operation portion when an operation in which the position of the operation portion is changed to pass over a predetermined area in the operation range in a predetermined direction is performed, and a control unit that switches a display mode of a map display displayed on a display device when it is detected from the detection result of the operation detecting unit that the position of the operation portion passes over the predetermined area in the predetermined direction.

A map display controller according to a second aspect of the invention includes: an operation portion that is operated in a predetermined operation range; an operation detecting unit that detects an operation position in the operation range; a vibration generating unit that applies predetermined vibration to the operation portion when an operation in which the operation position stays in a predetermined area in the operation range for a predetermined time or longer is performed; and a control unit that switches a display mode of a map display displayed on a display device when the predetermined vibration is applied to the operation portion by the vibration generating unit.

According to the aspects, it is possible to provide a map display controller that can easily switch a display mode of a map display.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A and 3B are diagrams illustrating a 3D map display and a 2D map display, respectively;

FIGS. 5A and 5B are diagrams illustrating an example of a method of operating a joystick for switching a display between the 3D map display and the 2D map display;

FIGS. 7A and 7B are diagrams illustrating another example of a method of operating the joystick for switching the display between the 3D map display and the 2D map display;

DETAILED DESCRIPTION OF EMBODIMENTS

Hereinafter, embodiments of the present invention will be described in detail with reference to the accompanying drawings.

Figure 1:
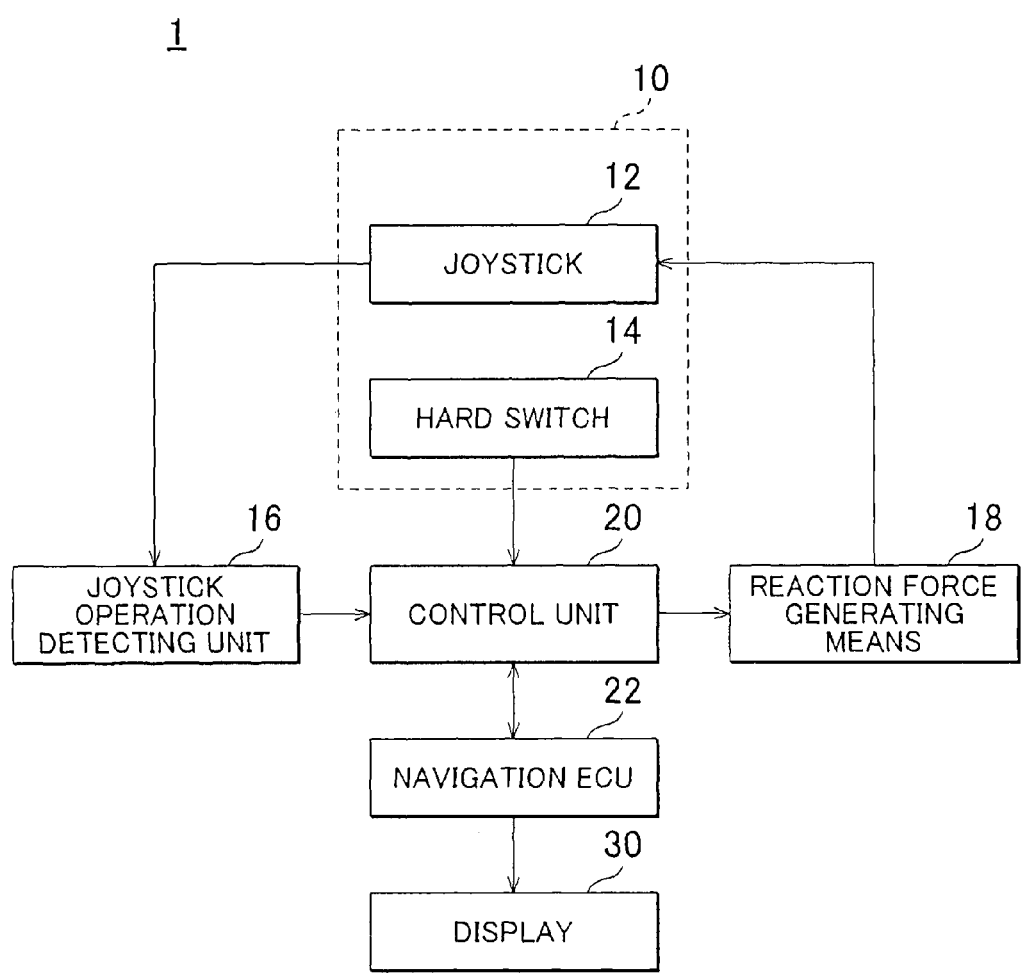
FIG. 1 is a diagram illustrating a configuration of a map display controller according to an embodiment of the present invention.
Figure 2:
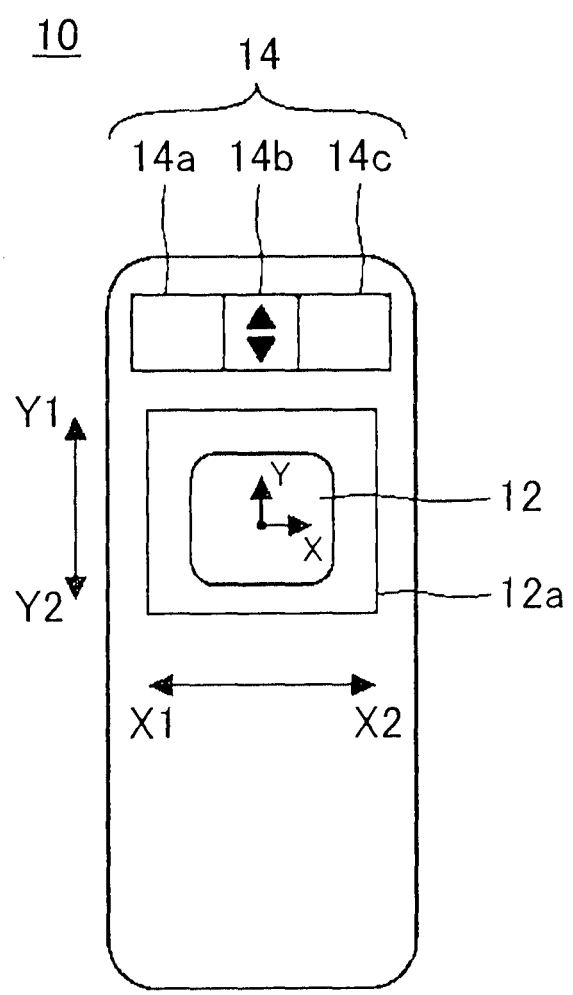
FIG. 2 is a top view schematically illustrating an operation unit.

FIG. 1 is a diagram illustrating a configuration of map display controller 1 according to an embodiment. FIG. 2 is a top view schematically illustrating an operation unit 10.

The map display controller 1 is mounted on a vehicle. In the example illustrated in FIG. 1, the map display controller 1 includes an operation unit 10, a joystick operation detecting unit 16, a reaction force generating unit 18, a control unit 20, a navigation electronic control unit (hereinafter, referred to as a navigation ECU) 22, and a display 30.

The operation unit 10 may be disposed, for example, in a center console section of the vehicle. The operation unit 10 is operated by a user and realizes various operations on a screen display displayed on the display 30. For example, various operations may include an operation of scrolling a map display displayed on the display 30, an operation of switching a screen display displayed on the display 30, an operation of selecting a choice item displayed on the display 30 (an operation of moving a cursor), and an operation of determining a selected choice item (a choice item on which the cursor is located).

A choice item forms an operation button which can be remotely operated through the use of the operation unit 10. The choice item (operation button) may be associated with an arbitrary type (function). That is, details which can be operated through the use of the operation unit 10 may be arbitrary. For example, the choice items may include a choice item for displaying (calling) an operation screen display or a map display for variously setting a navigation system on the display 30. The choice items may include a choice item for setting an air conditioner or a choice item (menu choice item) for displaying the operation screen display thereof on the display 30 in various ways. The choice items may include a choice item for variously setting an audio or a TV (such as adjustment of a sound volume) or a choice item (menu choice item) for displaying the operation screen display thereof on the display 30. The choice items may be choice items (such as icons or launchers) for starting arbitrary applications. The choice items may be character input buttons in an operation screen display such as a Japanese Syllabary input screen display. The choice items may include respective lists which are scrolled in a list screen. The choice items may include buttons for scrolling respective lists.

The operation unit 10 includes a joystick 12. The joystick 12 may be a lever type or a knob type and is mounted on the vehicle so as to be rotatable about an X axis (in a transverse direction of the vehicle) and to be rotatable about a Y axis (in a longitudinal direction of the vehicle). Accordingly, as illustrated in FIG. 2, the joystick 12 can be operated (tilted) in the transverse direction (X1 and X2 directions) and can be operated (tilted) in the longitudinal direction (Y1 and Y2 directions). The joystick 12 may be configuration not to be rotatable about an Z axis (an axis perpendicular to the X axis and the Y axis). FIG. 2 schematically illustrating a rectangular movable range (operation range) 12a of the joystick 12. The joystick 12 can be operated in the movable range 12a forward, backward, rightward, leftward, or in any combined direction thereof. The movable range 12a may be a transversely-long shape to correspond to a transversely-long shape of the display 30 or a square shape. Here, the aspect ratio may not be 1 (in general, the display 30 is transversely long). The movable range 12a may have a shape other than a rectangle. The joystick 12 may be configured to be slidable in the vehicle longitudinal direction and the vehicle transverse direction instead of being rotatable about the X axis and being rotatable about the Y axis. For example, the joystick 12 may implement parallel sliding movement perpendicular to the X axis and the Y axis through the use of a link mechanism.

The joystick 12 may be mounted on the vehicle so as to be pressed in the downward direction of the Z axis (in the direction perpendicular to the Z axis and the Y axis). In this case, the joystick 12 can be subjected to a pressing operation. The pressing operation on the joystick 12 may correspond to an operation (determination operation) of realizing determination of a selected choice item on the display 30.

The operation unit 10 may include a mechanical switch (hereinafter, referred, to as a "hard switch") 14 as an optional element. The hard switch 14 may be disposed, for example, in the vicinity of the joystick 12 or may be disposed in the joystick 12 itself (for example, a lever part of the joystick 12). In the example, illustrated in FIG. 2, the hard switch 14 is disposed on a more front side of the vehicle than the joystick 12 and includes three switches 14a, 14b, and 14c. For example, the switch 14c may be a menu switch for calling various menu choice items and the switch 14a may be a switch for calling a map display (home map display) based on a current position. The switch 14b may be a seesaw switch which is rotatable around the X axis (right-and-left direction) and may be a switch for enlarging and reducing a map display. When the pressing operation on the joystick 12 is not possible, the hard switch 14 may include a hard switch for a determination operation. The operation signal of the hard switch 14 is transmitted to the control unit 20.

The joystick operation detecting unit 16 detects an operation (movement) of the joystick 12. The joystick operation detecting unit 16 may include a sensor for detecting a rotation angle (the position in the front-and-rear direction of the joystick 12) around the X axis of the joystick 12 and a sensor for detecting a rotation angle (the position in the right-and-left direction of the joystick 12) around the Y axis of the joystick 12. These sensors may be, for example, a potentiometer or an optical encoder. When the pressing operation on the joystick 12 is possible, the joystick operation detecting unit 16 may include a sensor for detecting an applied pressing operation. In this case, the sensor may be a pressure sensor or a tact switch. The joystick operation detecting unit 16 transmits the detected operation information as an operation signal to the control unit 20.

The reaction force generating unit 18 generates a reaction force in response to a drive command from the control unit 20. The reaction force is applied to the joystick 12 and causes the joystick 12 to serve as a haptic device. The reaction force generating unit 18 may include an actuator for generating a reaction force around the X axis and an actuator for generating a reaction force around the Y axis. These actuators may be, for example, a DC motor. When an X-axis drive signal is received from the control unit 20, the actuator around the X axis is driven in response to the X-axis drive signal to generate a predetermined torque around the X axis. When a Y-axis drive signal is received from the control unit 20, the actuator around the Y axis is driven in response to the Y-axis drive signal to generate a predetermined torque around the Y axis.

The control unit 20 may include, for example, an electronic control unit (ECU). The functions of the control unit 20 may be arbitrarily embodied by hardware, software, firmware, or combinations thereof. For example, a part or all of the functions of the control unit 20 may be embodied by an application-specific integrated circuit (ASIC) or a field programmable gate array (FPGA). The functions of the control unit 20 may be embodied by cooperation of plural ECUs.

The control unit 20 performs reaction control of the joystick 12 through the use of the reaction force generating unit 18. The control unit 20 causes the reaction force generating unit 18 to generate a reaction force corresponding to the position of the joystick 12 (the position in a movable range 12a). The relationship between the reaction force generated by the reaction force generating unit 18 and the position of the joystick 12 may be defined in a map (hereinafter, referred to as a "reaction map"). The reaction map may be prepared depending on the types of the screen display on the display 30. In this case, the reaction map may be switched by interlocking with a change of the screen display on the display 30. The control unit 20 determines the position of the joystick 12 from the operation signal from the joystick operation detecting unit 16 and supplies the drive signal (the X-axis drive signal and/or the Y-axis drive signal) corresponding to the position of the joystick 12 to the reaction force generating unit 18 with reference to the reaction map.

The control unit 20 performs display control of the screen display on the display 30 in cooperation with the navigation ECU 22. The control unit 20 may perform a process of scrolling a map display displayed on the display 30, a process (transition process) of switching the screen display displayed on the display 30, a process of moving a cursor among the choice items, a process of moving a cursor (see the cursor 90 in FIGS. 5A and 5B) on the map display, and the like in response to the operation signal from the joystick operation detecting unit 16. The position of the cursor on the map display may be correlated with the position of the joystick 12 in the absolute coordinate system. That is, positions in the movable range 12a (for example, positions in a normal operation area A in FIG. 4) are absolutely correlated with the positions on the screen of the display 30. On the other hand, the movement of the cursor among the choice times may be correlated with the position of the joystick 12 in the absolute coordinate system or may be correlated therewith in a relative coordinate system based on the movement of the joystick 12. When the operation of pressing the joystick 12 is possible, the control unit 20 performs a process of determining a selected choice item in response to the operation signal indicating the pressing operation from the joystick operation detecting unit 16. The selected choice item may be a choice item at which the cursor is located. In this case, the choice item at which the cursor is located may be, for example, a choice item emphasized relative to other choice items. The determination process may be a process of performing a function corresponding to the determined choice item. For example, the determination process may be accompanied with a display of sub choice items, transition of a screen display such as a change of the screen display, an input of characters, a start of an application, and transmission of a control signal to another ECU (for example, an air-conditioner ECU). The determination process may be accompanied with appropriate changing of the display of the determined choice item or generating of a predetermined sound so as to inform the user of detection of the "determination operation".

In the course of displaying of the map display, the control unit 20 may selectively perform any one of a pointing mode and a scroll mode in cooperation with the navigation ECU 22. In the pointing mode, the control unit 20 moves a cursor (cursor 90 in FIGS. 5A and 5B) on the map display in response to an operation signal (operation signal indicating an operation in the front-and-rear direction and the right-and-left direction) from the joystick operation detecting unit 16. When the cursor is located at a position other than the present location, the control unit 20 may change the operation mode from the pointing mode to the scroll mode in response to an operation signal indicating a pressing operation from the joystick operation detecting unit 16. When the cursor is located at the present location, the control unit 20 may output point information around the present location (for example, points of interest (POI) or word-of-mouse information of peripheral facilities) in response to an operation signal indicating a pressing operation (determination operation) from the joystick operation detecting unit 16. In this case, the pointing mode may be maintained and a choice item may be displayed at each point on the map display. In this case, when the pressing operation (determination operation) is detected in a state where a choice item of a certain point is selected, the control unit 20 may output detailed information of the point.

The navigation ECU 22 detects the present location (the vehicle position) or the traveling direction on the basis of positioning information from a GPS receiver (not illustrated) and performs route guidance control to a destination or the like. At this time, the navigation ECU 22 may display the present location on the map display displayed on the display 30 to perform a variety of guidance. The navigation ECU 22 performs screen display control of the display 30 in cooperation with the control unit 20 as described above. At this time, the navigation ECU 22 generates an image signal for a screen display of the display 30 and transmits the generated image signal to the display 30. For example, when receiving a screen display switching command to a three-dimensional map display from the control unit 20 in the course of outputting a two-dimensional map display, the navigation ECU 22 generates an image signal obtained by drawing the three-dimensional map display and transmits the generated image signal to the display 30. A part or all of the navigation ECU 22 may be embodied by the control unit 20 or may be embodied by a processor which can be incorporated into the display 30.

The display 30 is disposed at (fixed to) a remote position from the operation unit 10. The display 30 may be an arbitrary display device such as a liquid crystal display or a head-up display (HUD). The display 30 is disposed at an appropriate position (for example, an instrument panel) in the vehicle interior. The display 30 may be a portable display. In this case, the display 30 is carried into the vehicle and is (temporarily) fixed to an appropriate position in the vehicle interior. The display 30 may be a touch panel display or a display not capable of sensing a touch. A map display, an operation screen display, or the like is displayed on the display 30. When the map display is not displayed thereon, videos of a TV, a periphery monitoring camera, or the like may be displayed on the display 30.

FIGS. 3A and 3B are diagrams illustrating a three-dimensional map display (hereinafter, referred to as a "3D map display") and a two-dimensional map display (hereinafter, referred to as a "2D map display"), where FIG. 3A schematically illustrates an example of a 3D map display and FIG. 3B schematically illustrates an example of a 2D map display.

As illustrated in FIG. 3B, the 2D map display may be a display showing a map in a mode (planar view) in which the ground is viewed from the sky. Therefore, two points having a constant distance is drawn in the same distance at any position on the map. For example, a road having the same width is drawn in the same width at any position on the map.

As illustrated in FIG. 3A, the 3D map display may be a display showing a map in a mode (overhead view or bird's-eye view) in which the ground is obliquely viewed from a high position (not as high as the sky). Therefore, two points having a constant distance may be drawn in a mode in which the distance therebetween decreases as it gets closer to the upper side of the map. For example, a road having the same width may be drawn in a width decreasing as it gets farther from a vehicle position display Q1. The 3D map display may be drawn in various types using 3D graphic techniques. For example, the 3D map display may be drawn in a perspective view when viewed down from a high viewpoint or may be drawn on the basis of a normal 2D map display with painting and memory factors (such as perspective, overlapping, and aerial perspective) added thereto. The 3D map display may be embodied by only simply deforming the 2D map display into a trapezoid depending on the perspective viewing down the 2D map display. Here, the display range of the 3D map display is not limited to the trapezoidal range illustrated in FIG. 3A, and may be a wide range covering the outside thereof. In the 3D map display, a horizon may be drawn at a certain distance and the sky may be drawn above the horizon. As illustrated in FIG. 3A, it is preferable that the 3D map display be drawn so that the vehicle traveling direction is directed to the upper side (head up). The 3D map display may be drawn so that the north is always directed to the upper side (north up). In the 3D map display illustrated in FIG. 3A, a building display Q2 is schematically drawn in a planar rectangular (trapezoidal) shape, but may be drawn in a parallelepiped shape (trapezoidal solid) or may be drawn more realistically. The height of the viewpoint of the 3D map display may be adjusted by a user.

Figure 4:
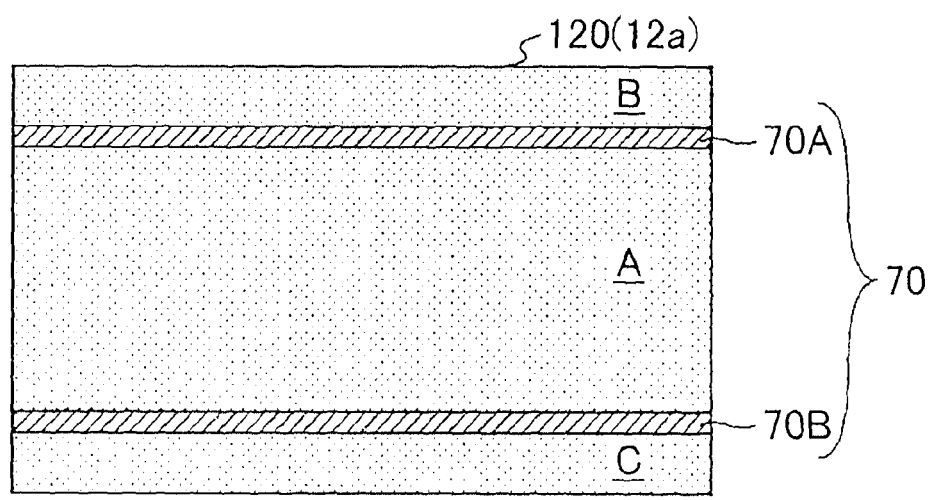
FIG. 4 is a diagram illustrating an example of a reaction map for forming a reaction wall.

FIG. 4 is a diagram illustrating a reaction wall 70 and is a diagram illustrating an example of a reaction map for forming the reaction wall 70. In FIG. 4, the region of the reaction wall 70 in a reaction map is schematically illustrated by hatching.

The reaction map may be a map in which the magnitude and the direction of a reaction force are defined depending on the position of the joystick 12. The reaction map may be set on the basis of the assumption of a rectangular map area 120 corresponding to a movable range 12a of the position of the joystick 12 as illustrated in FIG. 4. The positions in the movable range 12*a* may be respectively correlated with the positions in the map area 120 in a one-to-one correspondence manner (in the absolute coordinate system). That is, the positions of the joystick 12 (the positions in the movable range 12*a*) may be correlated with the positions in the map area 120 in a one-to-one correspondence manner. In the below description, regarding the position of the joystick 12 or the positional relationship in the map area 120, the "upper-and-lower direction" is defined so that a side (deep side) distant from a user (operator) is the upper side and a side (front side) close to the user is the lower side.

In the example illustrated in FIG. 4, the reaction wall 70 includes an upper reaction wall 70A extending in the transverse direction (vehicle transverse direction) on the lower side of the upper edge of the map area 120 and on the upper side (the vehicle front side) of the center of the map area 120 and a lower reaction wall 70B extending in the transverse direction (vehicle transverse direction) on the upper side of the lower edge of the map area 120 and on the lower side of the center of the map area 120. The reaction walls 70 have a function of resisting a variation in position of the joystick 12 (that is, movement of the joystick 12) with a reaction force of a predetermined value or larger when the position of the joystick 12 passes over the areas of the reaction walls 70 in a predetermined direction. That is, the reaction wall 70 has a function of generating a reaction force for bounding the joystick 12 back as if a wall were present at that position. The reaction force of a predetermined value or larger generated by the reaction walls 70 may be an arbitrary value within a range in which the reaction force can be overcome by a normal user's operating force or may be adapted in consideration of the operability or a feeling of moderation (feeling of wall). The positions of the reaction walls 70A, 70B in the upper-and-lower direction or the thickness W of the reaction walls 70A, 70B are arbitrary, but may be determined from the viewpoint of sufficient securing of a normal operation area (see the normal operation area A in FIG. 4).

In the example illustrated in FIG. 4, when the position of the joystick 12 moves from the normal operation area A to the area B and the position of the joystick 12 gets close to the position of the reaction wall 70A, the reaction wall 70A is activated to generate a reaction force of a predetermined value or larger in the direction (downward direction) in which the joystick is returned to the normal operation area A. When the user further moves the joystick 12 to the vehicle front side with a force larger than the reaction force of the predetermined value or larger, the position of the joystick 12 moves to the area B and the reaction force is reduced (the reaction wall 70A is passed). When the position of the joystick 12 is returned from the area B to the normal operation area A, the reaction wall 70A may not generate a reaction force or may generate an attraction force to the normal operation area A. Similarly, when the position of the joystick 12 moves from the normal operation area A to the area C and the position of the joystick 12 gets close to the position of the reaction wall 70B, the reaction wall 70B is activated to generate a reaction force of a predetermined value or larger in the direction (upward direction) in which the joystick is returned to the normal operation area A. When the user further moves the joystick 12 to the vehicle rear side with a force larger than the reaction force of the predetermined value or larger, the position of the joystick 12 moves to the area C and the reaction force is reduced (the reaction wall 70B is passed). When the position of the joystick 12 is returned from the area C to the normal operation area A, the reaction wall 70B may not generate a reaction force or may generate an attraction force to the normal operation area A.

The reaction map may be set so that a force (center-directed force) for attracting the joystick to the center of the normal operation area A (which corresponds to the neutral position of the joystick 12) is applied to the joystick 12 when the position of the joystick 12 is located in the normal operation area A. In this case, the magnitude of the force generated in the normal operation area A is set in consideration of the operability in the normal operation area A, but may be set to be significantly smaller than the magnitude of the force generated by the reaction wall 70A and the reaction wall 70B. The reaction map may be set so that an outward force (toward the outer edge of the movable range 12*a*) for giving a feeling of passing over the reaction wall 70 is applied to the joystick 12.

In the example, illustrated in FIG. 4, the reaction wall 70 includes two reaction walls 70A, 70B associated with the movement in the front-and-rear direction of the joystick 12, but the reaction wall 70 may similarly include reaction walls associated with the movement in the right-and-left direction. When operation items are displayed on the map display, the reaction map may be set so that a force for attracting the joystick to the position corresponding to a display position of each operation item is applied to the joystick 12.

FIGS. 5A and 5B are diagrams illustrating an example of a method of operating the joystick 12 for switching a display mode between the 3D map display and the 2D map display, where FIG. 5A illustrates display switching from the 3D map display to the 2D map display and FIG. 5B illustrates display switching from the 2D map display to the 3D map display. In each of FIGS. 5A and 5B, the upper part shows a map display on the display 30 and the lower part shows the operation unit 10. In FIGS. 5A and 5B, the positions of the reaction walls 70A, 70B against the operation of the joystick 12 are illustrated as images for the convenience of explanation, but the reaction walls 70A, 70B are not drawn in the map display. Display switching in the pointing mode will be described below, but the same is true of display switching in the scroll mode.

As illustrated in FIGS. 5A and 5B, when the user moves the joystick 12 to the vehicle rear side as indicated by the arrow P1 in displaying the 3D map display, the cursor 90 accordingly moves downward in the map display of the display 30. When the joystick 12 gets close to the position of the reaction wall 70B (when the cursor 90 accordingly gets close to the position of the reaction wall 70B), the user feels a reaction force via the joystick 12 (that is, the user obtain a feeling of wall). When the user moves the joystick 12 to the vehicle rear side with a force equal to or larger than the reaction force as indicated by the arrow P2, the joystick 12 passes over the position of the reaction wall 70B and the reaction force disappears (or an outward attraction force appears). That is, a wall passing operation on the reaction wall 70B is realized. In FIG. 5A, an image of the wall passing operation on the reaction wall 70B is indicated by the arrow P3.

When the wall passing operation on the reaction wall 70B (see the arrow P2) is detected, the control unit 20 switches the map display on the display 30 from the 3D map display to the 2D map display. The wall passing operation on the reaction wall 70B may be detected using any method. For example, the wall passing operation on the reaction wall 70B may be detected on the basis of the operation information from the joystick operation detecting unit 16. In this case, the wall passing operation on the reaction wall 70B may be detected on the basis of a variation in position of the joystick 12 (a variation in position in which the joystick passes over the area of the reaction wall 70B from the upper side to the lower side).

As illustrated in FIGS. 5A and 5B, when the user moves the joystick 12 to the vehicle front side as indicated by the arrow P4 in displaying the 2D map display, the cursor 90 accordingly moves upward in the map display of the display 30. When the joystick 12 gets close to the position of the reaction wall 70A (when the cursor 90 accordingly gets close to the position of the reaction wall 70A), the user feels a reaction force via the joystick 12. When the user moves the joystick 12 to the vehicle front side with a force equal to or larger than the reaction force as indicated by the arrow P5, the joystick 12 passes over the position of the reaction wall 70A and the reaction force disappears. That is, a wall passing operation on the reaction wall 70A is realized. In FIG. 5B, an image of the wall passing operation on the reaction wall 70A is indicated by the arrow P6.

When the wall passing operation on the reaction wall 70A (see the arrow P5) is detected, the control unit 20 switches the map display on the display 30 from the 2D map display to the 3D map display. The wall passing operation on the reaction wall 70A may be detected using any method. For example, the wall passing operation on the reaction wall 70A may be detected on the basis of the operation information from the joystick operation detecting unit 16. In this case, the wall passing operation on the reaction wall 70A may be detected on the basis of a variation in position of the joystick 12 (a variation in position in which the joystick passes over the area of the reaction wall 70A from the lower side to the upper side).

The switching between the 2D map display and the 3D map display accompanying the wall passing operation on the reaction wall 70 may be realized by continuous transition accompanied with animation. Accordingly, the user can intuitively understand the variation in viewpoint of the map. The continuously transition accompanied with animation may be embodied in an arbitrary mode, and may be embodied, for example, in a mode in which the map display rises upward and the height of the viewpoint increases (zoom out) at the time of switching from the 3D map display to the 2D map display. On the contrary, the continuous transition accompanied with animation may be embodied in a mode in which the map display falls to the deep side and the height of the viewpoint decreases at the time of switching from the 2D map display to the 3D map display.

In this way, according to the example illustrated in FIGS. 5A and 5B, the switching from the 2D map display to the 3D map display is embodied by passing over the upper reaction wall 70A, and the switching from the 3D map display to the 2D map display is embodied by passing over the lower reaction wall 70B. In this case, since the operation direction for switching the map display (the direction of the wall passing operation) corresponds to the variation of the map display, the user can intuitively easily perform a switching operation between the 2D map display and the 3D map display. That is, since the user can causes the map display to fall with a sense of pressing the upper part of the map display (transition to the 3D map display) and can cause the map display to rise up with a sense of pressing the lower part of the map display (transition to the 2D map display), the user can perform an intuitive operation. In general, since the screen of the display 30 is disposed to stand upright substantially vertically, this assignment is optimal. Here, the contrary thereto may be established. That is, the switching from the 3D map display to the 2D map display is embodied by passing over the upper reaction wall 70A, and the switching from the 2D map display to the 3D map display is embodied by passing over the lower reaction wall 70B.

In the example illustrated in FIGS. 5A and 5B, the reaction wall 70A may function only in displaying of the 2D map display. That is, the reaction wall 70A may be deactivated in displaying of the 3D map display. Similarly, the reaction wall 70B may function only in displaying of the 3D map display. That is, the reaction wall 70B may be deactivated in displaying of the 2D map display. For example, individual reaction maps may be prepared for the 2D map display and the 3D map display, the reaction wall 70B may not be formed in the reaction map for the 2D map display, and the reaction wall 70A may not be formed in the reaction map for the 3D map display. Alternatively, both the reaction wall 70A and the reaction wall 70B may function in displaying of both the 2D map display and the 3D map display. In this case, in displaying of the 2D map display, another function (a function other than the switching function from the 3D map display to the 2D map display) may be assigned to the wall passing operation on the reaction wall 70B. Similarly, in displaying of the 3D map display, another function (a function other than the switching function from the 2D map display to the 3D map display) may be assigned to the wall passing operation on the reaction wall 70A. As described above, right and left reaction walls may be similarly set in the right-and-left direction. In this case, other functions (for example, a function of calling various menu choice items or a function of returning to the map display) may be assigned to the wall passing operations on the right and left reaction walls.

Figure 6:
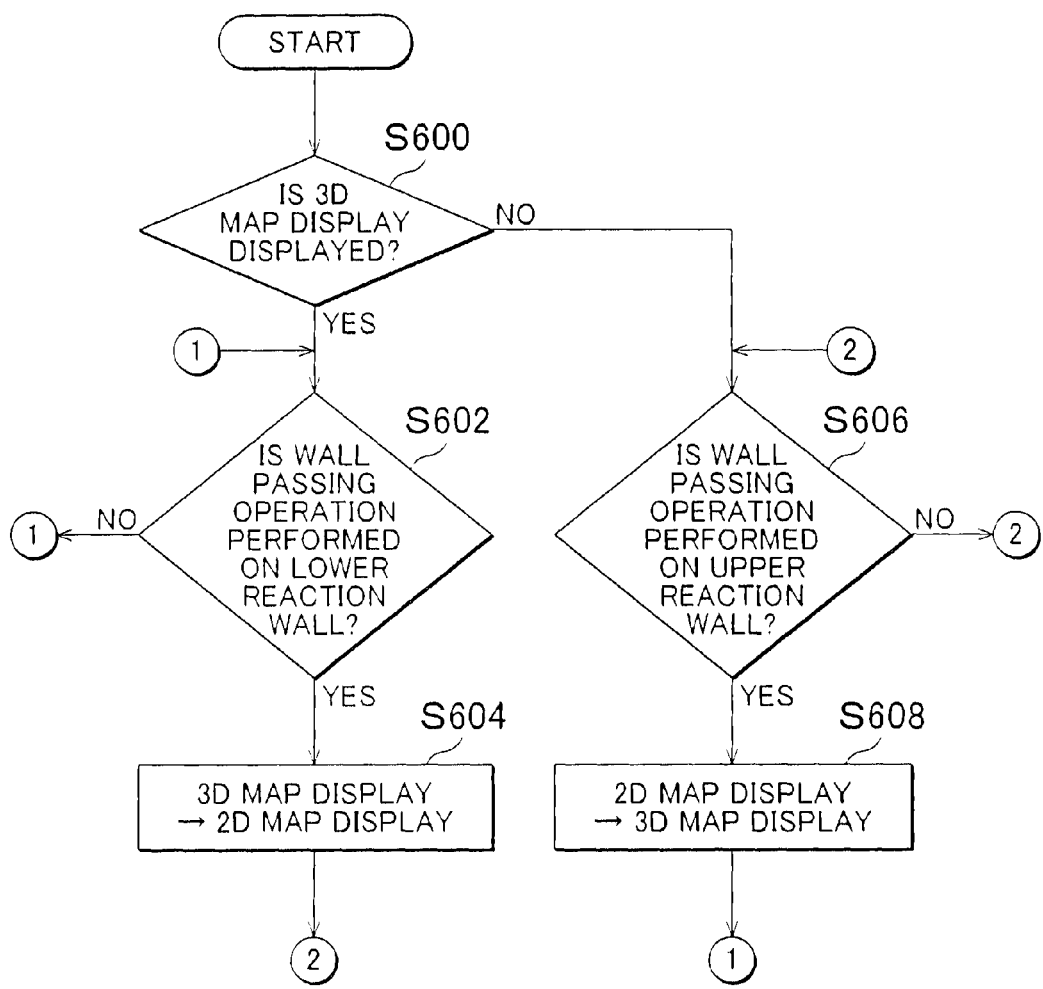
FIG. 6 is a flowchart illustrating an example of a process flow in a control unit associated with switching of the display between the 3D map display and the 2D map display illustrated in FIGS. 5A and 5B.

FIG. 6 is a flowchart illustrating an example of a process flow in the control unit 20 associated with the display switching between the 3D map display and the 2D map display illustrated in FIGS. 5A and 5B. The process flow illustrated in FIG. 6 may be repeatedly performed for every predetermined process cycle, for example, only while a map display is displayed on the display 30.

In step 600, it is determined whether the map display displayed on the display 30 is the 3D map display. That is, it is determined whether the 3D map display is displayed on the display 30. The process of step 602 is performed when it is determined that the 3D map display is displayed, and the process of step 606 is performed otherwise (that is, when the 2D map display is displayed).

In step 602, it is determined on the basis of the operation information from the joystick operation detecting unit 16 whether the wall passing operation on the lower reaction wall 70B is detected. The process of step 604 is performed when it is determined that the wall passing operation on the reaction wall 70B is detected, and the process of step 602 is performed again in the next process cycle otherwise.

In step 604, the map display on the display 30 is switched from the 3D map display to the 2D map display. At this time, in order to deactivate the lower reaction wall 70B and to activate the upper reaction wall 70A, the reaction map may be switched from the reaction map for the 3D map display to the reaction map for the 2D map display. When the process of step 604 is finished, the process of step 606 is started in the next process cycle.

In step 606, it is determined on the basis of the operation information from the joystick operation detecting unit 16 whether the wall passing operation on the upper reaction wall 70A is detected. The process of step 608 is performed when it is determined that the wall passing operation on the reaction wall 70A is detected, and the process of step 606 is performed again in the next process cycle otherwise.

In step 608, the map display on the display 30 is switched from the 2D map display to the 3D map display. At this time, in order to deactivate the upper reaction wall 70A and to activate the lower reaction wall 70B, the reaction map may be switched from the reaction map for the 2D map display to the reaction map for the 3D map display. When the process of step 608 is finished, the process of step 602 is started in the next process cycle.

FIGS. 7A and 7B are diagrams illustrating another example of a method of operating the joystick 12 for switching a display mode between the 3D map display and the 2D map display. In each of FIGS. 7A and 7B, the upper part shows a map display on the display 30 and the lower part shows the operation unit 10. In FIGS. 7A and 7B, the positions of the reaction walls 70A, 70B against the operation of the joystick 12 are illustrated as images for the convenience of explanation, but the reaction walls 70A, 70B are not drawn in the map display.

The example illustrated in FIGS. 7A and 7B is different from the example illustrated in FIGS. 5A and 5B, in that operation guide displays 92A and 92B are output. The difference will be mainly described below. The other elements (for example, the reaction wall 70A and the reaction wall 70B) may be the same as illustrated in FIGS. 5A and 5B. In the example illustrated in FIGS. 7A and 7B, it is on the premise that the joystick 12 can be subjected to a pressing operation. The display switching in the pointing mode will be described below, but the same is true of display switching in the scroll mode.

The control unit 20 displays the operation guide displays 92A and 92B in response to the operation signal from the joystick operation detecting unit 16 in cooperation with the navigation ECU 22. Specifically, the control unit 20 may display the operation guide display 92A when the position of the joystick 12 is located at the position of the reaction wall 70A or in the vicinity thereof. Similarly, the control unit 20 may display the operation guide display 92B when the position of the joystick 12 is located at the position of the reaction wall 70B or in the vicinity thereof.

The operation guide display 92A preferably has a shape for promoting an upward operation (that is, the wall passing operation on the reaction wall 70A). For this purpose, in the example illustrated in FIG. 7B, the operation guide display 92A includes a shape of an upward arrow. At this time, the operation guide display 92A may include information for recalling the function (switching from the 2D map display to the 3D map display) which is embodied by the wall passing operation on the reaction wall 70A. In the example illustrated in FIG. 7B, the operation guide display 92A includes a character display "3D" below the upward arrow. Accordingly, a user as a beginner not familiar with the operation method can get a hint that the switching to the 3D map display is possible by the wall passing operation.

Similarly, the operation guide display 92B preferably has a shape for promoting a downward operation (that is, the wall passing operation on the reaction wall 70B). For this purpose, in the example illustrated in FIG. 7A, the operation guide display 92B includes a shape of a downward arrow. At this time, the operation guide display 92B may include information for recalling the function (switching from the 3D map display to the 2D map display) which is embodied by the wall passing operation on the reaction wall 70B. In the example illustrated in FIG. 7A, the operation guide display 92B includes a character display "2D" below the downward arrow. Accordingly, a user as a beginner not familiar with the operation method can get a hint that the switching to the 2D map display is possible by the wall passing operation.

In the example illustrated in FIG. 7A, since the operation guide display 92B is displayed in the 3D map display, and the operation guide display 92B is displayed in an overhead view. Similarly, in the example illustrated in FIG. 7B, since the operation guide display 92A is displayed in the 2D map display, and the operation guide display 92A is displayed in a planar view.

The operation guide display 92A may be simply a display but may function as a choice item (operation switch). In this case, when the joystick 12 is subjected to a pressing operation in displaying of the operation guide display 92A (that is, when the cursor 90 is located on the operation guide display 92A), the control unit 20 switches the 2D map display to the 3D map display in response thereto. Accordingly, a user as a beginner not familiar with the operation method can easily perform the switching operation to the 3D map display through the use of the wall passing operation. When the user as a beginner accidentally applies a force in the direction of passing over the reaction wall 70A (an excessive force is accidentally applied), the switching from the 2D map display to the 3D map display is performed and thus the user can learn the wall passing operation (see the wall passing operation). In this case, the user can perform the switching operation from the 2D map display to the 3D map display through the use of the wall passing operation which is simpler than the pressing operation.

Similarly, the operation guide display 92B may be simply a display but may function as a choice item (operation switch). In this case, when the joystick 12 is subjected to a pressing operation in displaying of the operation guide display 92B (that is, when the cursor 90 is located on the operation guide display 92B), the control unit 20 switches the 3D map display to the 2D map display in response thereto. Accordingly, a user as a beginner not familiar with the operation method can easily perform the switching operation to the 2D map display through the use of the wall passing operation. When the user as a beginner accidentally applies a force in the direction of passing over the reaction wall 70B, the switching from the 3D map display to the 2D map display is performed and thus the user can learn the wall passing operation.

In the example illustrated in FIGS. 7A and 7B, the operation guide display 92A may be displayed only in displaying of the 2D map display. That is, in displaying of the 3D map display, the operation guide display 92A may not be displayed even when the cursor 90 is located in the vicinity of the reaction wall 70A. Similarly, the operation guide display 92B may be displayed only in displaying of the 3D map display. That is, in displaying of the 2D map display, the operation guide display 92B may not be displayed even when the cursor 90 is located in the vicinity of the reaction wall 70B.

Figure 8:
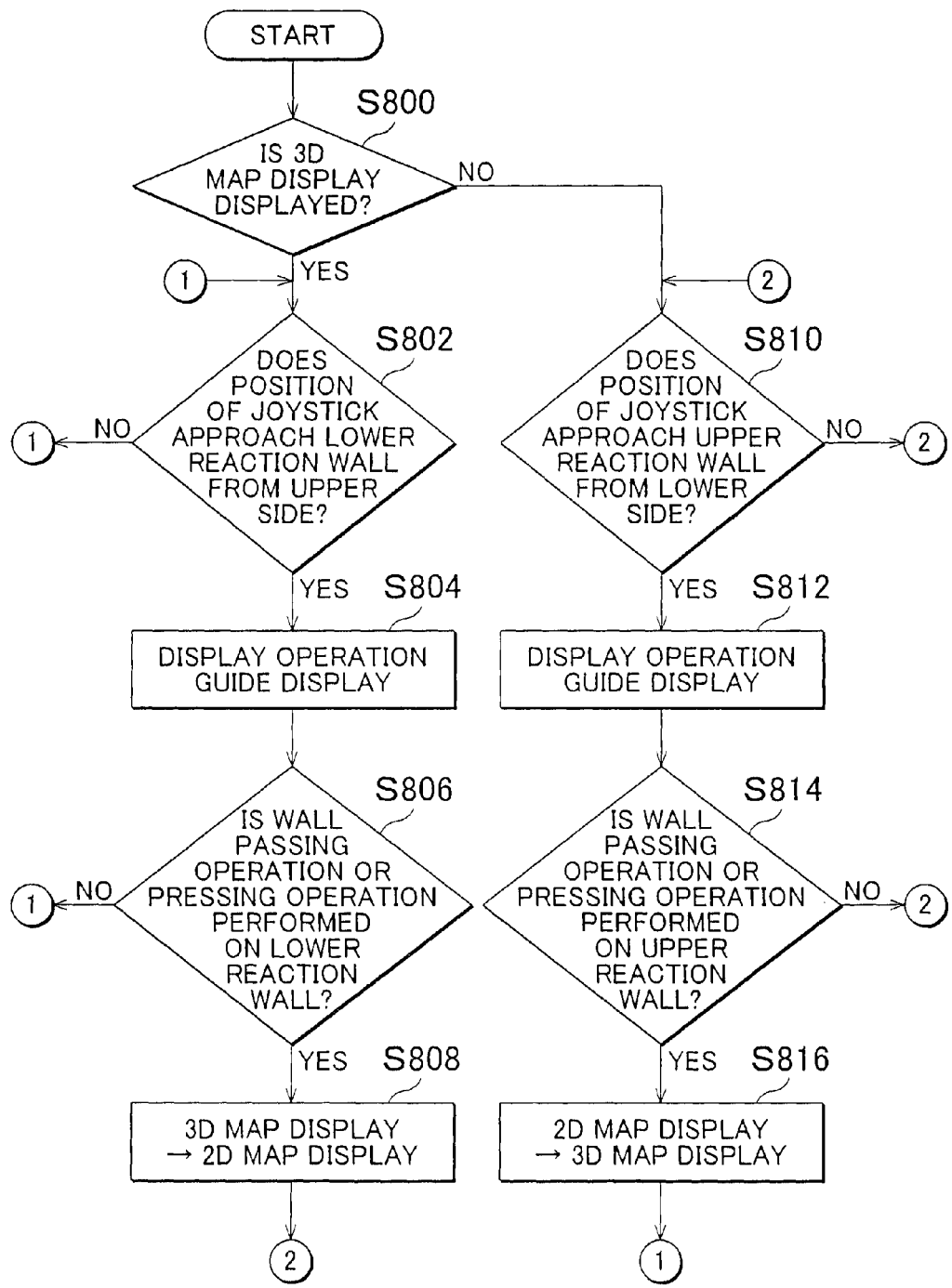
FIG. 8 is a flowchart illustrating an example of a process flow in a control unit associated with switching of the display between the 3D map display and the 2D map display illustrated in FIGS. 7A and 7B.

FIG. 8 is a flowchart illustrating an example of a process flow in the control unit 20 associated with the display switching between the 3D map display and the 2D map display illustrated in FIGS. 7A and 7B. The process flow illustrated in FIG. 8 may be repeatedly performed for every predetermined process cycle, for example, only while a map display is displayed on the display 30.

In step 800, it is determined whether the 3D map display is displayed on the display 30. The process of step 802 is performed when it is determined that the 3D map display is displayed, and the process of step 810 is performed otherwise (that is, when the 2D map display is displayed).

In step 802, it is determined on the basis of the operation information from the joystick operation detecting unit 16 whether the position of the joystick 12 is located on the upper side within a predetermined distance from the lower reaction wall 70B. The predetermined distance is a distance indicating the vicinity of the lower reaction wall 70B and may be any distance equal to or more than 0. For example, the predetermined distance may correspond to the length in the upper-and-lower direction of the operation guide display 92B. The process of step 804 is performed when it is determined that the position of the joystick 12 is located on the upper side within the predetermined distance from the lower reaction wall 70B, and the process of step 802 is performed again in the next process cycle otherwise.

In step 804, the operation guide display 92B (see FIG. 7B) is displayed, and then the process of step 806 is performed. When the operation guide display 92B is displayed in the previous process cycle, the display state of the operation guide display 92B is maintained.

In step 806, it is determined on the basis of the operation information from the joystick operation detecting unit 16 whether the wall passing operation on the lower reaction wall 70B is detected or whether the pressing operation on the joystick 12 is detected. The process of step 808 is performed when it is determined that the wall passing operation on the reaction wall 70B or the pressing operation on the joystick 12 is detected, and the process of step 802 is started again in the next process cycle otherwise (when any operation is not detected).

In step 808, the map display on the display 30 is switched from the 3D map display to the 2D map display. At this time, the operation guide display 92B may be deleted. At this time, in order to deactivate the lower reaction wall 70B and to activate the upper reaction wall 70A, the reaction map may be switched from the reaction map for the 3D map display to the reaction map for the 2D map display. When the process of step 808 is finished, the process of step 810 is started in the next process cycle.

In step 810, it is determined on the basis of the operation information from the joystick operation detecting unit 16 whether the position of the joystick 12 is located on the lower side within a predetermined distance from the upper reaction wall 70A. The predetermined distance is a distance indicating the vicinity of the upper reaction wall 70A and may be any distance equal to or more than 0. For example, the predetermined distance may correspond to the length in the upper-and-lower direction of the operation guide display 92A. The process of step 812 is performed when it is determined that the position of the joystick 12 is located on the lower side within the predetermined distance from the upper reaction wall 70A, and the process of step 810 is performed again in the next process cycle otherwise.

In step 812, the operation guide display 92A (see FIG. 7A) is displayed, and then the process of step 814 is performed. When the operation guide display 92A is displayed in the previous process cycle, the display state of the operation guide display 92A is maintained.

In step 814, it is determined on the basis of the operation information from the joystick operation detecting unit 16 whether the wall passing operation on the upper reaction wall 70A is detected or whether the pressing operation on the joystick 12 is detected. The process of step 816 is performed when it is determined that the wall passing operation on the reaction wall 70A or the pressing operation on the joystick 12 is detected, and the process of step 810 is started again in the next process cycle otherwise (when any operation is not detected).

In step 816, the map display on the display 30 is switched from the 2D map display to the 3D map display. At this time, the operation guide display 92A may be deleted. At this time, in order to deactivate the upper reaction wall 70A and to activate the lower reaction wall 70B, the reaction map may be switched from the reaction map for the 2D map display to the reaction map for the 3D map display. When the process of step 816 is finished, the process of step 802 is started in the next process cycle.

In the example illustrated in FIGS. 7A and 7B and FIG. 8, the switching between the 2D map display and the 3D map display is embodied by the pressing operation on the joystick 12 in displaying of the operation guide display 92A or 92B. However, for example, when a hard switch 14 for the determination operation is provided and a pressing operation (determination operation) on the hard switch 14 for the determination operation is detected in displaying of the operation guide display 92A or 92B, the switching between the 2D map display and the 3D map display may be embodied similarly.

While the embodiments are described above, the present invention is not limited to the specific embodiments and may, be modified and changed in various forms within the scope of the appended claims. All or a part of the elements in the above-mentioned embodiments may be combined.

For example, in the above-mentioned embodiments, the reaction wall 70 includes two reaction walls 70A and 70B associated with the movement in the front-and-rear direction of the joystick 12, respectively, but may similarly include reaction walls (two reaction walls on the right and left sides) associated with the movement in the right-and-left direction instead of or in addition to the two reaction walls 70A and 70B on the upper and lower sides. In this case, the switching function from the 2D map display to the 3D map display and the switching function from the 3D map display to the 2D map display may be assigned to the wall passing operations on the right and left reaction walls. The reaction walls to which the switching function from the 2D map display to the 3D map display and the switching function from the 3D map display to the 2D map display are assigned do not need to be walls extending straightly in the right-and-left direction or in the upper-and-lower direction, and may be walls extending obliquely straightly. The reaction walls to which the switching function from the 2D map display to the 3D map display and the switching function from the 3D map display to the 2D map display are assigned do not need to extend from one end of the movable range 12a to the other end thereof, and may be walls terminating in the middle.

In the above-mentioned embodiments, the reaction force is electrically generated from the reaction wall 70, but may be a mechanical (physical) reaction force.

In the above-mentioned embodiments, the map display controller 1 is mounted on a vehicle, but may be used in a place other than the vehicle (for example, for applications of displaying a map display on a display of a personal computer at home or the like). The above-mentioned embodiments are associated with the map display for navigation, but may be applied to a map display for applications (for example, simple viewing) other than the navigation.

In the above-mentioned embodiments, details of the characteristics (reaction map) of the reaction wall 70 are not particularly limited. For example, in the reaction wall 70A (which is similar to the reaction wall 70B and which is true of the following description), the force (the reaction force against the upward operation) generated in the area of the reaction wall 70A does not need to be constant and may have, for example, characteristics that the reaction force is the largest at the center in the upper-and-lower direction and decreases toward the upper and lower edges. In the transverse direction in the area of the reaction wall 70A, similarly, the reaction force may have characteristics that a constant force is generated at any position in the transverse direction of the area of the reaction wall 70A or may have characteristics that different forces are generated depending on the positions in the transverse direction. In brief, the reaction wall 70A has only to be an area ii which a downward force is generated. The force generated in the area of the reaction wall 70A may have characteristics depending on only the position of the joystick 12 and not depending on the variation direction of the position of the joystick 12 or may have characteristics depending on both the position of the joystick 12 and the variation direction of the position of the joystick 12. For example, in the former, the force generated from the reaction wall 70A serves as a "reaction force" for the operation passing over the reaction wall 70A upward from the normal operation area A, and the force generated from the reaction wall 70A serves as a "thrust force (attraction force to the center)" for the operation passing over the reaction wall 70A downward from the normal operation area A. In the latter, the reaction force (downward force) may be generated from the reaction wall 70A for the operation passing over the reaction wall 70A upward and the downward force may not be generated from the reaction wall 70A for the operation passing over the reaction wall 70A downward. In this case, a small upward force (a force which is not felt as a reaction force) may be generated from the reaction wall 70A for the operation passing over the reaction wall 70A downward.

In the above-mentioned embodiments, the joystick 12 is used as an example of the operation member, but another operation member having the same frictional indication mechanism may be used. For example, a track ball, a planar touch pad (FIG. 8), or the like may be used instead of the joystick 12. Here, a reaction force (haptic mechanism) may not be used and a reaction force mechanism achieving the same effect may be provided depending on the aspects. For example, the track ball may be provided with a braking mechanism suppressing the rotation. The planar touch pad may be provided with a vibration mechanism providing a feeling of presence of a wall. In the planar touch pad, for example, the function of the reaction wall 70 may be embodied by generating predetermined vibration (vibration feedback).

Figure 9:
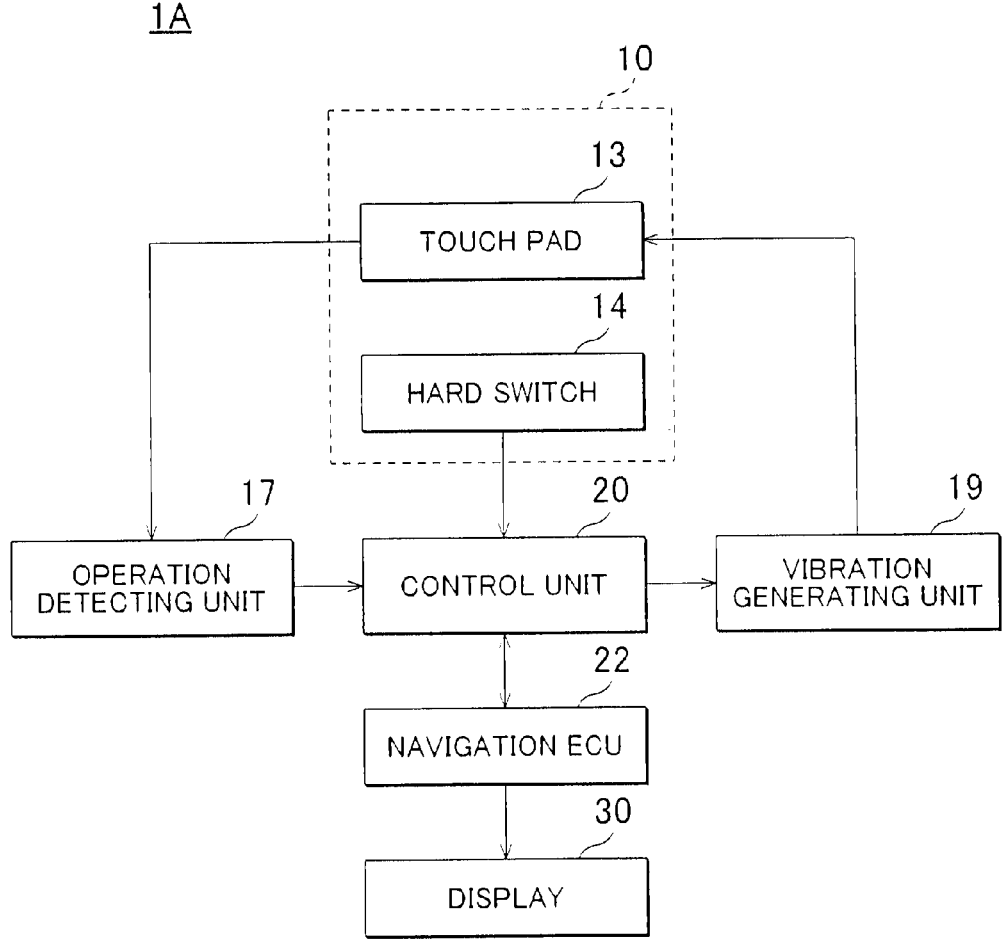
FIG. 9 is a diagram illustrating an example of a configuration of a map display controller using a planar touch pad as an operation member.

FIG. 9 is a diagram illustrating an example of a map display controller 1A using a planar touch pad 13 as the operation member. The same elements as illustrated in FIG. 1 will be referenced by the same reference signs and description thereof will not be repeated.

The map display controller 1A includes a planar touch pad 13 instead of the joystick 12, an operation detecting unit 17 instead of the joystick operation detecting unit 16, and a vibration generating unit 19 instead of the reaction force generating unit 18. The operation detecting unit 17 detects a position of a user's finger on the touch pad 13. A mechanism for detecting a touch operation on the planar touch pad 13 may be an electrostatic sensor, but the touch operation may be detected using another principle (sensor). For example, the planar touch pad 13 may be of a pressure-sensing type or a ultrasonic surface acoustic wave type. The vibration generating unit 19 gives vibration to the planar touch pad 13. The vibration generating unit 19 may include a mechanism for transmitting vibration to the touch pad 13.

The control unit 20 controls the vibration generating unit 19 on the basis of information from the operation detecting unit 17 so as to perform the same functions as the functions of the above-mentioned reaction wall 70 (for example, the reaction walls 70A and 70B). For example, when a user moves a finger on the planar touch pad so as to slide to the vehicle rear side in displaying of the 3D map display, the cursor 90 accordingly moves downward on the map display on the display 30. When the cursor 90 moves to the lower end on the map display and then the finger is continuously touched for a predetermined time or longer in a state where the cursor 90 is located at the lower end on the map display, vibration (for example, single pulse vibration) is generated in the planar touch pad through the use of the vibration generating unit 19. Accordingly, the user feels wall passing. That is, the wall passing operation on the reaction wall 70B is embodied. The position of the cursor on the map display may be correlated with the position in the operation area of the planar touch pad 13 in an absolute coordinate system or in a relative coordinate system. In the absolute coordinate system, when the touch of the user's finger is maintained for a predetermined time or longer at a position at which the finger approaches or touches the lower end (frame) of the planar touch pad 13, vibration may be generated in the planar touch pad 13. In the relative coordinate system, when the touch of the user's finger is maintained for a predetermined time or longer at the position of the finger on the planar touch pad 13 when the cursor 90 moves to the lower end on the map display, vibration may be generated in the planar touch pad 13. In this case, the "predetermined area in the operation range" described in claim 9 corresponds to the "position at which the finger approaches or touches the lower end (frame) of the planar touch pad 13" in the absolute coordinate system, and corresponds to the "position of the user's finger on the planar touch pad 13 when the cursor 90 moves to the lower end on the map display" in the relative coordinate system. These details are true of the wall passing operation on the reaction wall 70A.

What is claimed is:

1. A map display controller comprising:
an operation portion that operates within a predetermined operation range;
an operation detecting unit that detects an operation on the operation portion;
a reaction force generating unit that applies a reaction force against a change in position of the operation portion to the operation portion when an operation in which the position of the operation portion is changed to pass over a predetermined area in the operation range in a predetermined direction is performed; and
a control unit that switches a display mode of a map display displayed on a display device when it is detected from the detection result of the operation detecting unit that the position of the operation portion passes over the predetermined area in the predetermined direction, the display mode including a planar map display and an overhead map display,
wherein the predetermined area includes (i) a first predetermined area disposed on a side in an upper direction extending from a center of the operation range and (ii) a second predetermined area disposed on a side in a lower direction extending from the center of the operation range, the predetermined direction including the upper direction and the lower direction, the upper direction corresponding to a direction extending toward a front side in a vehicle front-rear direction and the lower direction corresponding to a direction extending toward a rear side in the vehicle front-rear direction, and the control unit switches from the planar map display to the overhead map display when it is detected that the position of the operation portion passes over the first predetermined area in the upper direction, and the control unit switches from the overhead map display to the planar map display when it is detected that the position of the operation portion passes over the second predetermined area in the lower direction.

2. The map display controller according to claim 1, wherein the control unit moves a cursor on the map display depending on the change in position of the operation portion when it is detected from the detection result of the operation detecting unit that the position of the operation portion is changed without passing over the predetermined area in the predetermined direction.

3. The map display controller according to claim 1, wherein the control unit displays an operation guide display for displaying a function, which is realized when the position of the operation portion passes over (i) the first predetermined area in the upper direction, when the position of the operation portion is located prior to the first predetermined area in the upper direction, or (ii) the second predetermined area in the lower direction, when the position of the operation portion is located prior to the second predetermined area in the lower direction.

4. The map display controller according to claim 3, wherein the operation portion is subjected to a pressing operation, and
wherein the control unit switches the display mode of the map display when it is detected from the detection result of the operation detecting unit that the operation portion is subjected to the pressing operation during displaying of the operation guide display.

5. The map display controller according to claim 3, further comprising a switch that is disposed on the operation portion or around the operation portion and that is subjected to a pressing operation,
wherein the control unit switches the display mode of the map display when it is detected that the switch is subjected to the pressing operation during displaying of the operation guide display.

6. A map display controller comprising:
an operation portion that is operated in a predetermined operation range;
an operation detecting unit that detects an operation position in the operation range;
a vibration generating unit that applies predetermined vibration to the operation portion when an operation in which the operation position stays in a predetermined area in the operation range for a predetermined time or longer is performed; and
a control unit that switches a display mode of a map display displayed on a display device when the predetermined vibration is applied to the operation portion by the vibration generating unit, the display mode including a planar map display and an overhead map display,
wherein the predetermined area includes (i) a first predetermined area disposed on a side in an upper direction extending from a center of the operation range and (ii) a second predetermined area disposed on a side in a lower direction extending from the center of the operation range, the upper direction corresponding to a direction extending toward a front side in a vehicle front-rear direction and the lower direction corresponding to a direction extending toward a rear side in the vehicle front-rear direction, and
the control unit switches from the planar map display to the overhead map display when it is detected that the predetermined vibration is applied to the operation portion in the first predetermined area, and the control unit switches from the overhead map display to the planar map display when it is detected that the predetermined vibration is applied to the operation portion in the second predetermined area.

* * * * *